July 8, 1941.　　A. G. F. WALLGREN　　2,248,142
BEARING
Filed May 17, 1937　　2 Sheets-Sheet 1
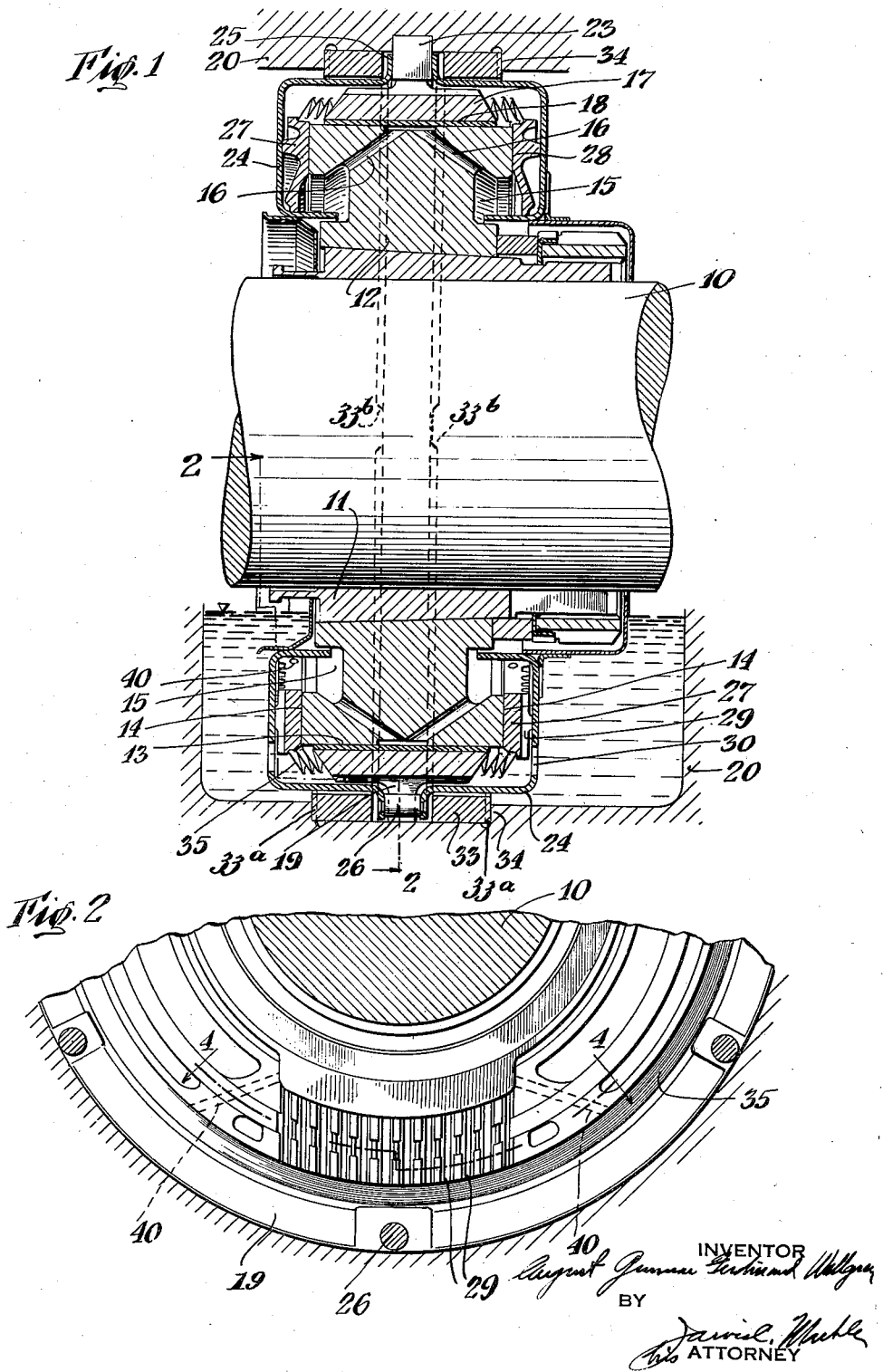

July 8, 1941.   A. G. F. WALLGREN   2,248,142
BEARING
Filed May 17, 1937   2 Sheets-Sheet 2
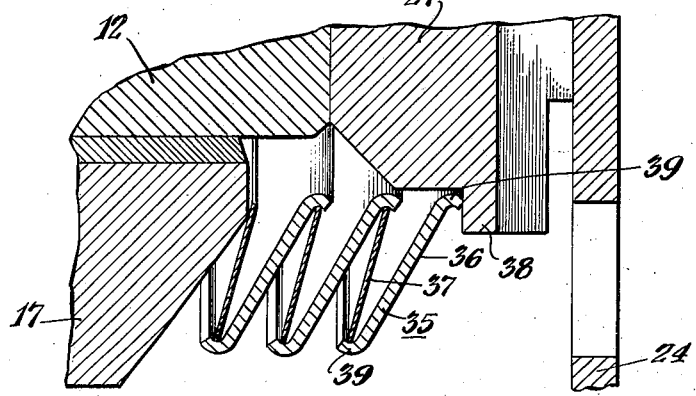
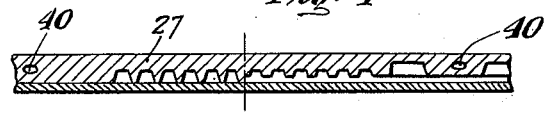
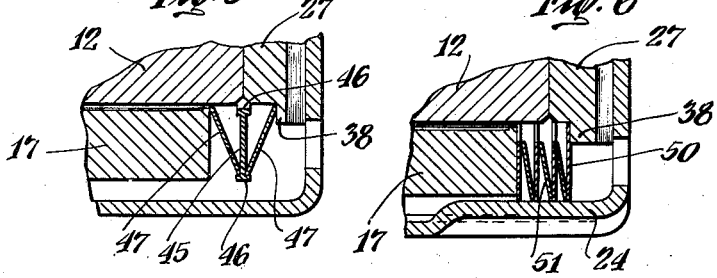
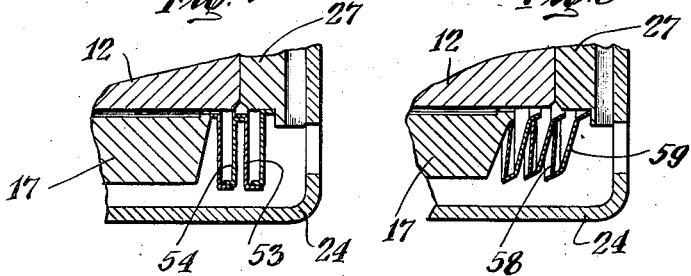

Patented July 8, 1941

2,248,142

UNITED STATES PATENT OFFICE 2,248,142

BEARING

August Gunnar Ferdinand Wallgren, Stockholm, Sweden, assignor, by mesne assignments, to Aktiebolaget Nomy, Lidkoping, Sweden, a corporation of Sweden Application May 17, 1937, Serial No. 143,064
In Sweden May 19, 1936

9 Claims. (Cl. 308—127)

My invention relates to bearings and more particularly to an improvement in the lubrication of bearings. In accordance with my invention partitioning means are provided within a bearing housing for enclosing the rotating parts of the bearing in order to confine the agitation of lubrication caused thereby.

One feature of my invention is that circulation of lubricant may take place within the enclosed space independently of the main body of lubricant in the bearing housing outside of this space, while means are also provided for the circulation of lubricant through the partitioning means.

Another feature of my invention is that a portion of the partitioning means is constructed of flexible material in order to permit limited movement between certain of the parts. The material of the flexible portion is also preferably elastic so as to exert a force tending to maintain the aforesaid movable parts in a normal position and to return the parts to such position when they are displaced therefrom.

Further objects and advantages of my invention will be apparent from the following description considered in connection with the accompanying drawings, which form a part of this specification and of which:

Fig. 1 is a cross-sectional view showing one embodiment of my invention;

Fig. 2 is a cross-sectional view taken on the line 2—2 of Fig. 1, but with the hood member 24 removed;

Fig. 3 is a cross-sectional view on an enlarged scale of a portion of the device shown in Fig. 1;

Fig. 4 is a cross-sectional view taken on the line 4—4 of Fig. 2; and

Figs. 5 through 8 are views similar to Fig. 3, but showing different embodiments of my invention.

Referring more particularly to Figs. 1 through 4, reference character 10 designates a rotatable shaft. Secured to shaft 10 by means of a conical locking member 11 is an inner rotatable bearing member 12. Member 12 is formed with an outer cylindrical radial bearing surface 13 and with annular thrust bearing surfaces 14. Annular grooves 15 are formed in the ends of member 12 radially within thrust bearing surfaces 14. A plurality of lubricant passages 16 connect grooves 15 with the central part of the radial bearing surface 13.

An outer annular bearing member 17 is formed with an inner cylindrical bearing surface 18 which cooperates with the bearing surface 13 on member 12. Bearing member 17 is formed with an outer annular projection 19 which serves to tiltably support the member 17 within a bearing housing 20. A key 23 secured in a keyway formed in projection 19 loosely engages a keyway formed in housing 20 to prevent rotation of bearing member 17 within the housing, while permitting tilting thereof.

Disposed on either side of bearing members 12 and 17 are hood members 24. The hood members are provided with outwardly extending annular flanges 25 which are spaced a short distance on either side of annular projection 19, the flanges being connected to each other by means of pins 26 extending through openings formed in projection 19. Hood members 24 have fixed thereto rotationally stationary thrust bearing members 27 which are formed with thrust bearing surfaces 28 cooperating with the thrust bearing surfaces 14 formed on inner bearing member 12. The lower part of each thrust bearing member 27 is formed with vertically extending grooves 29 which, together with adjacent portions of the hood member 24, form passages extending from within the radially outer spaces of the hood members to the grooves 15 formed in the ends of bearing member 12. The hood members are formed with openings 30 adjacent the outer ends of passages 29.

The hood members 24 are supported within the bearing housing 20 by means of Cardan rings 33, each of which has diametrically opposed projections 33a on one side thereof which bear against abutments 34 formed in the bearing housing and projections 33b on the other side at points 90° therefrom, which bear against the radial flanges 25 of the hood members. The hood members are thus supported within the bearing housing in a manner permitting universal movement with respect thereto. This type of support for the hood members is shown and described more in detail in my Patent 2,148,144, issued February 21, 1939.

The ends of outer bearing member 17 are connected in fluid-tight relation with the outer circumference of thrust bearing members 27 by means of flexible partitions 35, shown more in detail in Fig. 3. The flexible partitions are made up of a plurality of annular rigid conical members 36 between which are disposed annular flexible conical members 37. Thrust bearing member 27 is formed with a shoulder 38 against which the outermost member 36 abuts and each of the members 36 is formed with turned-over edges 39 which provide grooves for receiving the inner and outer edges of the flexible annular members 37. The innermost flexible member 37 bears against the end face of bearing member 17. The outermost rigid member 36 is centered on thrust bearing member 27, the next flexible member 37 is centered within the aforesaid end member 36, while the next rigid member 36 is centered by the aforesaid flexible member 37. The parts are so positioned that, when they are assembled, the flexible members are stressed in such a manner that the entire partitioning structure 35 is under compression in an axial direction. This results in the innermost flexible member 37 being held tightly against the bearing member 17.

Thrust bearing members 27 are formed with passages 40 extending from adjacent the annular grooves 15 to the spaces enclosed by the flexible partitions 35. It will be seen that the outer bearing member 17, the flexible partitions 35, the thrust bearing members 27, and the radial inner portions of the hood members 24 together form partitioning means which completely enclose the rotatable bearing member 12 and isolate it from the main body of lubricant contained in the housing 20 outside of the hood members. The space within this partitioning means is connected to the main body of lubricant by means of the passageways 29. Circulation within the enclosed space may take place from the grooves 15 through the passages 16 to the radial bearing surfaces, along these surfaces to the space enclosed by the flexible portion 35 of the partitioning means and thence back to the grooves 15 through the passages 40.

The operation of the above described device is as follows:

Rotation of shaft 10 causes inner bearing member 12 to rotate therewith and a lubricant film is built up between the radial bearing surfaces 13 and 18 which prevents direct metal-to-metal contact at these surfaces. The radial load of the shaft is transmitted through this film to the stationary bearing member 17 and the annular projection 19 which transmits it to the bearing housing 20. In the event of misalignment of shaft 10, causing wobbling of the shaft and consequently of bearing member 12, stationary bearing member 17 will tilt slightly on the annular projection 19 in order to accommodate itself to the wobbling of member 12.

Thrust load from shaft 10 is transmitted to bearing member 12 and thence to one or the other of the thrust bearing members 27, depending upon the direction of the thrust. The load is transmitted from member 27 to the supporting hood member 24, from where it is transmitted through Cardan ring 33 to the bearing housing. The provision of the Cardan rings permits the thrust bearing members 27 to wobble with bearing member 12 in the event of shaft misalignment.

Lubricant from the main body within housing 12 may pass through openings 30 in hood members 24 and thence to passages 29 to the annular space defined by grooves 15. Rotation of bearing member 12 results in centrifugal force causing the lubrication to flow radially outwardly through the passages 16 to the radial bearing surfaces, and also radially outwardly across the thrust bearing surfaces. The lubricant which reaches the center of the radial bearing surfaces then passes axially toward the end of the bearing to the spaces within the flexible partitions 35 from where it may flow back to groove 15 through passages 40 in stationary member 27.

It will thus be seen that the rotating member 12 is completely separated from the main body of lubricant in the bearing housing and hence this main body is not agitated by rotation of the bearing member. While the lubricant is able to flow either in or out through the passages 29, the length and small cross-sectional area of these passages prevent agitation being communicated to the lubricant outside of the hood members. As above described, lubricant may circulate freely within the space included within the partitioning means.

Due to the fact that the radial bearing surfaces 13 and 18 are cylindrical, the inner bearing member may be displaced axially with respect to the outer bearing member under the influence of varying thrust loads, and particularly to accommodate shaft expansion or contraction due to a change in temperature. Such displacement of the inner bearing member causes the stationary thrust bearing members to be displaced slightly, such displacement being permitted by the slightly flexible nature of the supporting hood members and small clearances. The flexibility of the parts 35 of the partitioning means permits movement to take place between the thrust bearing members and the outer bearing member 17, as well as other limited relative movements due to wobbling of these members in the event of a misaligned shaft. The elasticity of the members 37 tend, however, to maintain the thrust bearing members 27 and the outer bearing member 17 in a normal position with respect to each other. Thus, when a thrust load which has caused axial displacement of these members to take place is removed, the elasticity of members 37 tends to return the bearing members to their normal position.

In Fig. 5 there is shown another embodiment of the flexible portion 35 of the partitioning means. As here shown a single rigid annular member 45 formed with inner and outer flanges 46 is provided. Flexible elastic conical members 47 are disposed on either side of member 45 and have their outer edges engaged with the outer flange 46. The right-hand member 47, as viewed in Fig. 5, abuts against the shoulder 38 formed on thrust bearing member 27 and is centered by the thrust bearing member. This member 47 in turn centers the rigid member 45, which in turn centers the left-hand flexible member 47. The inner edge of left-hand member 47 bears against outer bearing member 17. The parts are so proportioned that when assembled the members 47 are stressed. The inner flange 46 limits axial displacement of the member 17 with respect to member 27 and prevents a complete collapse of the flexible portion of the partitioning means.

Another embodiment is shown in Fig. 6 wherein alternate flat and conical spring discs 50 and 51, respectively, are provided. The outer diameters of discs 50 and 51 are substantially the same as the inner diameter of hood members 24 and are thus centered by the hood members. The structure comprising discs 50 and 51 are compressed between outer bearing member 17 and the shoulders 38 formed on the thrust bearing members 27.

In Fig. 7 the flexible structure comprises elastic discs 53 and 54. Each disc has an outer cylindrical flange extending from one side of the disc and an inner cylindrical flange extending from the opposite side of the disc. Inner and outer flanges of adjacent discs overlap as is clearly shown in the figure whereby each disc acts to center the next one, the outermost disc being centered on thrust bearing member 27. When assembled, the discs are deformed into slightly conical shape, whereby the entire structure is slightly compressed.

In Fig. 8 the flexible structure comprises flat discs 58 alternated with conical discs 59. The inner and outer edges of the conical discs extend obliquely with respect to the central parts of the discs in order to provide centering means for the different discs, the outermost disc being centered on the thrust bearing member 27. When assembled the flat discs 58 are deformed into slightly conical shape as shown in Fig. 8, whereby the entire structure is placed under tension.

While my invention has been shown as applied to a bearing having substantially continuous bearing surfaces, this has been done for purposes of illustration only. Obviously the invention may be applied to other bearings, such as block, roller or ball bearings. The scope of my invention is to be limited only by the appended claims viewed in the light of the prior art.

What I claim is:

1. In a bearing, inner bearing means, outer bearing means, said means having cooperating bearing surfaces, means providing a reservoir for lubricant, and partition means together with said outer bearing means enclosing a space around said bearing surfaces and separating said surfaces from the main body of lubricant in said reservoir, said partition means and said outer bearing means serving to completely close said space radially beyond said surfaces and said partition means being formed with a passage communicating with said space radially within said surfaces.

2. In a bearing, an inner rotatable bearing member, an outer rotationally stationary bearing member, said members having cooperating bearing surfaces, a rotationally stationary annular member disposed at one side of said bearing members, said outer bearing member and said annular member being arranged for limited relative displacement, and substantially fluid-tight flexible structure disposed between said outer bearing member and said annular member.

3. In a bearing, an inner rotatable bearing member, an outer rotationally stationary bearing member, said members having cooperating bearing surfaces, a rotationally stationary annular member disposed at one side of said bearing members, said outer bearing member and said annular member being arranged for limited relative displacement, and substantially fluid-tight flexible structure disposed between said outer bearing member and said annular member, said structure including a plurality of annular interlocking disc-like members, at least some of said members being flexible.

4. In a bearing, an inner rotatable bearing member, an outer rotationally stationary bearing member, said members having cooperating bearing surfaces, a rotationally stationary annular member disposed at one side of said bearing members, said outer bearing member and said annular member being arranged for limited relative displacement, and substantially fluid-tight flexible structure disposed between said outer bearing member and said annular member, said structure including a plurality of annular interlocking disc-like members, alternate members being substantially rigid and intermediate members being flexible and elastic.

5. In a bearing, an inner rotatable bearing member, an outer rotationally stationary bearing member, said members having cooperating radial bearing surfaces, a thrust bearing member disposed at one side of said inner member and having a thrust bearing surface cooperating with a thrust bearing surface formed on the end of said inner member, said outer member and said thrust bearing member being arranged for limited relative displacement, and a substantially fluid-tight flexible elastic structure disposed between said outer bearing member and said thrust bearing member, said structure including a plurality of annular disc-like members centered by each other, one of said disc-like members being centered on said thrust bearing member.

6. In a bearing, an inner rotatable bearing member, an outer rotationally stationary bearing member, said members having cooperating bearing surfaces, a rotationally stationary annular member disposed at one side of said bearing members, said outer bearing member and said annular member being arranged for limited relative displacement, and subsantially fluid-tight flexible structure disposed between said outer bearing member and said annular member, said structure including a rigid member having an outer flange, and conical flexible members disposed on either side of the rigid member and contacting said outer bearing member and said annular member, respectively.

7. In a bearing, an inner rotatable bearing member, an outer rotationally stationary bearing member, said members having cooperating bearing surfaces, a rotationally stationary annular member disposed at one side of said bearing members, said outer bearing member and said annular member being arranged for limited relative displacement, and substantially fluid-tight flexible structure disposed between said outer bearing member and said annular member, said structure including a plurality of flexible annular disc-like members, each member having a flange extending from its inner edge on one side and a flange extending from its outer edge on the other side, the flanges on adjacent disc-like members overlapping whereby each member centers the successive member.

8. In a bearing, an inner rotatable bearing member, an outer rotationally stationary bearing member, said members having cooperating bearing surfaces, a rotationally stationary annular member disposed at one side of said bearing members, said outer bearing member and said annular member being arranged for limited relative displacement, and substantially fluid-tight flexible structure disposed between said outer bearing member and said annular member, said structure including a plurality of flexible annular disc-like members, alternate members being conical and formed with obliquely extending inner and outer edges, the intermediate members being initially flat and disposed between the oblique edges of adjacent conical members.

9. In a bearing, an inner bearing member formed with radial and thrust bearing surfaces, an outer radial bearing member, means providing a reservoir for lubricant, partition means together with said outer bearing member inclosing a space around said bearing surfaces and separating said surfaces from the main body of lubricant in said reservoir, and thrust bearing surfaces carried by said partition means, said partition means and said outer bearing member serving to completely close said space radially beyond said surfaces and said partition means being formed with a passage communicating with said space radially within said surfaces.

AUGUST GUNNAR
FERDINAND WALLGREN.